United States Patent
Martin

(10) Patent No.: US 11,249,824 B2
(45) Date of Patent: Feb. 15, 2022

(54) BALANCING A RECURRING TASK BETWEEN MULTIPLE WORKER PROCESSES

(71) Applicant: Red Hat, Inc., Raleigh, NC (US)

(72) Inventor: David Martin, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 391 days.

(21) Appl. No.: 15/496,621

(22) Filed: Apr. 25, 2017

(65) Prior Publication Data

US 2018/0307534 A1    Oct. 25, 2018

(51) Int. Cl.
    *G06F 9/54*    (2006.01)

(52) U.S. Cl.
    CPC .................... *G06F 9/546* (2013.01)

(58) Field of Classification Search
    CPC ...... G06F 9/4843; G06F 9/5005; G06F 9/546; G06F 9/48; G06F 9/50
    See application file for complete search history.

(56) References Cited

U.S. PATENT DOCUMENTS

| | | | | |
|---|---|---|---|---|
| 6,034,621 A * | 3/2000 | Kaufman | ............... | G06Q 99/00 340/7.21 |
| 8,255,571 B2 | 8/2012 | Sharp et al. | | |
| 8,495,311 B2 * | 7/2013 | Martin | ............... | G06F 12/00 711/150 |
| 8,621,216 B2 | 12/2013 | Husa | | |
| 9,439,238 B1 * | 9/2016 | Sitaram | ............. | H04W 36/0072 |
| 9,477,491 B2 | 10/2016 | Ben-Shaul et al. | | |
| 9,578,130 B1 * | 2/2017 | Nguyen | ................... | H04L 67/32 |
| 11,057,464 B1 * | 7/2021 | Wei | ..................... | G06F 21/6245 |
| 2006/0129556 A1 * | 6/2006 | Reuter | ............... | H04L 67/1097 |
| 2010/0262953 A1 | 10/2010 | Barboni et al. | | |
| 2014/0229652 A1 * | 8/2014 | Yadav | ................. | G06F 13/4022 710/316 |
| 2014/0304398 A1 * | 10/2014 | Carlen | ...................... | G06F 9/54 709/224 |
| 2014/0379647 A1 | 12/2014 | Smith et al. | | |
| 2016/0065672 A1 | 3/2016 | Savage et al. | | |
| 2018/0218058 A1 * | 8/2018 | Liu | ....................... | G06F 9/4881 |

(Continued)

FOREIGN PATENT DOCUMENTS

WO    2015181462 A1    12/2015

OTHER PUBLICATIONS

Author Unknown, "Implement the remainder of the worker debugger API," Bugzilla@Mozilla, Bug 1092102, accessed Mar. 28, 2017, bugzilla.mozilla.org/show_bug.cgi?id=1092102, Mozilla, pp. 1-36.

(Continued)

*Primary Examiner* — Meng Ai T An
*Assistant Examiner* — Willy W Huaracha
(74) *Attorney, Agent, or Firm* — Withrow & Terranova, PLLC

(57) ABSTRACT

Balancing a recurring task between multiple worker processes is disclosed. Each of a plurality of worker processes attempt, over a period of time, to acquire a task lock. A first worker process of the plurality of worker processes acquires the task lock. The first worker process performs a task that is associated with the task lock and sets a timer for an amount of time that prevents acquisition of the task lock by any other worker process for the amount of time.

10 Claims, 6 Drawing Sheets

(56) References Cited

U.S. PATENT DOCUMENTS

2018/0329739 A1* 11/2018 Cooper .................. G06F 9/466

OTHER PUBLICATIONS

Gulati, Shekhar, "Best Practices For Horizontal Application Scaling," OPENSHIFT, Jul. 10, 2013, blog.openshift.com/best-practices-for-horizontal-application-scaling/, Red Hat, 6 pages.
Jpthek9, "Client-Server Lockstep Model," last edited Feb. 3, 2015, accessed Feb. 28, 2017, forum.unity.com/threads/client-server-lockstep-model.295486/, Unity Technologies, pp. 1-5.
Kosik, Sergey, "Synchronization algorithm for exchanging data in the "Client-Server" model via Rest API," Searching for Contradictions, Aug. 27, 2013, accessed Mar. 28, 2017, havrl.blogspot.in/2013/08/synchronization%ADalgorithm%ADfor.html, Havrl, 23 pages.
ProgrammerNewbie et al., "Data Synchronization in mobile apps—multiple devices, multiple users," Software Engineering, Web Forum, last updated Jul. 29, 2013, accessed Mar. 28, 2017, softwareengineering.stackexchange.com/questions/206310/data-synchronization-in-mobile-apps-multiple-devices-multiple-users/3#3, Stack Exchange Inc., pp. 1-3.

* cited by examiner

BALANCING A RECURRING TASK BETWEEN MULTIPLE WORKER PROCESSES

TECHNICAL FIELD

The examples relate generally to performing a recurring task and, in particular, to balancing a recurring task between multiple worker processes.

BACKGROUND

Often a resource, such as a data structure, is shared among multiple worker processes. Periodically, or intermittently, the resource may need to be updated or otherwise modified. For example, the resource may need to be synchronized with one or more other resources from time to time.

SUMMARY

The examples relate to balancing a recurring task between multiple worker processes. The examples help ensure that the recurring task is not repeatedly performed by the same worker process, and that the recurring task is not performed more often than is necessary.

In one example a method is provided. The method includes attempting, by each of a plurality of worker processes over a period of time, to acquire a task lock. The method further includes acquiring, by a first worker process of the plurality of worker processes, the task lock. The method further includes performing, by the first worker process of the plurality of worker processes, a task that is associated with the task lock, and setting, by the first worker process, a timer for an amount of time that prevents acquisition of the task lock by any other worker process of the plurality of worker processes for the amount of time.

In another example a computing device is provided. The computing device includes a memory and a processor device coupled to the memory. The processor device is to initiate a plurality of worker processes. The processor device is further to attempt, by each of the plurality of worker processes over a period of time, to acquire a task lock, and to acquire, by a first worker process of the plurality of worker processes, the task lock. The processor device is further to perform, by the first worker process of the plurality of worker processes, a task that is associated with the task lock, and to set, by the first worker process, a timer for an amount of time that prevents acquisition of the task lock by any other worker process of the plurality of worker processes for the amount of time.

In another example a computer program product is provided. The computer program product is stored on a non-transitory computer-readable storage medium and includes instructions to cause a processor device to initiate a plurality of worker processes. The instructions further cause the processor device to attempt, by each of the plurality of worker processes over a period of time, to acquire a task lock. The instructions further cause the processor device to acquire, by a first worker process of the plurality of worker processes, the task lock. The instructions further cause the processor device to perform, by the first worker process of the plurality of worker processes, a task that is associated with the task lock, and to set, by the first worker process, a timer for an amount of time that prevents acquisition of the task lock by any other worker process of the plurality of worker processes for the amount of time.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
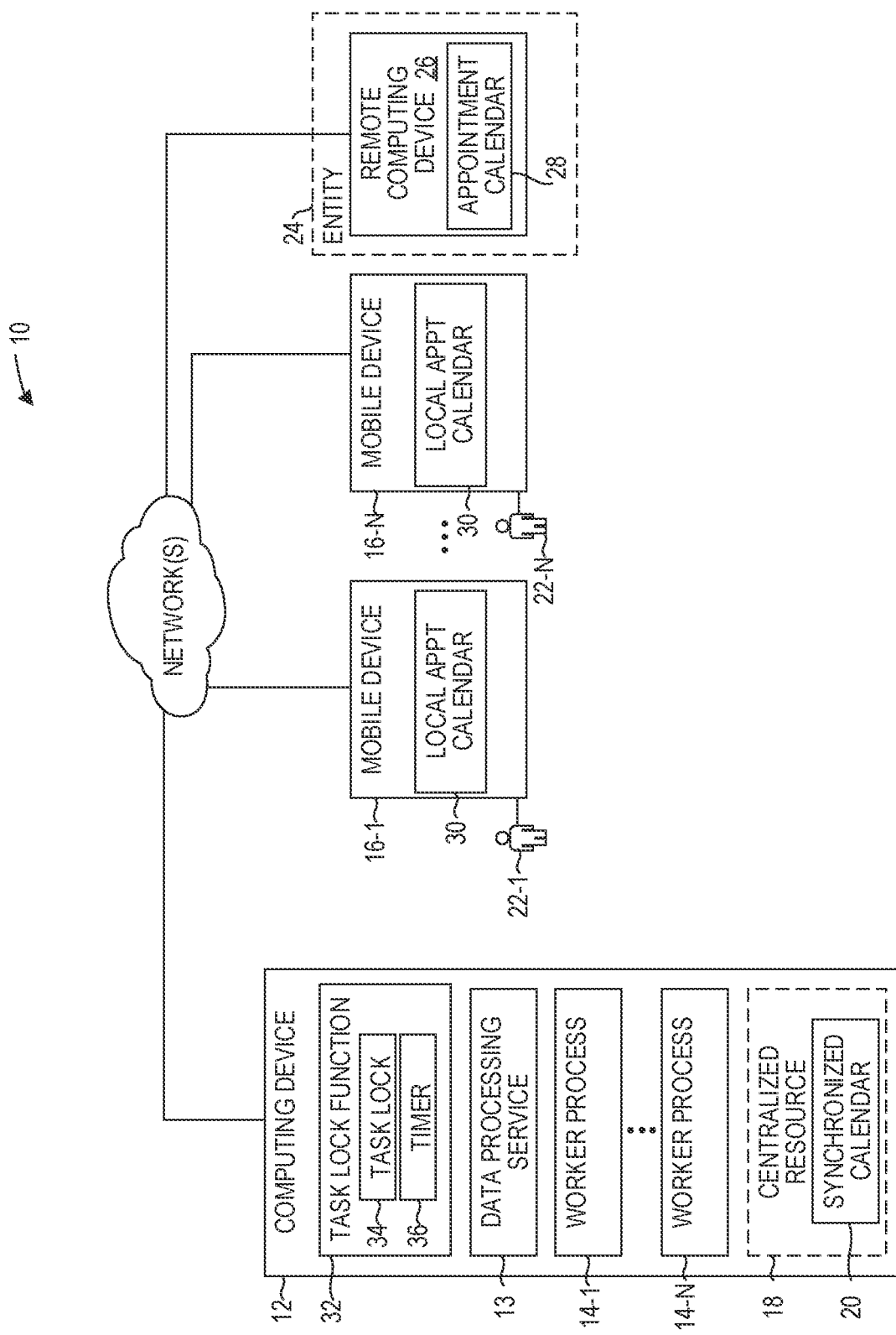
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first worker process" and "second worker process," and does not imply a priority, a type, an importance, or other attribute, unless otherwise stated herein. As used herein and in the claims, the articles "a" and "an" in reference to an element refers to "one or more" of the element unless otherwise explicitly specified.

Data processing systems often provide services via a plurality of worker processes. Among other advantages, this allows the data processing service to scale up or down based on a current demand by implementing additional worker processes if greater service requests are demanded, or by terminating worker processes if fewer service requests are demanded. Often a data processing system utilizes one or more centralized resources, such as one or more data structures, that are utilized by the worker processes while handling service requests. A centralized resource may need to be updated from time to time, and often a particular worker process is designated to periodically, or intermittently, perform a task associated with modification of the centralized resource. Sometimes the task may take a relatively long period of time, during which time the worker process cannot handle service requests, which may prevent certain service requests from being processed while the worker process is modifying the centralized resource. This can result in a relatively long delay in handling certain service requests, which may cause user dissatisfaction.

The examples implement balancing a recurring task between multiple worker processes, such that the recurring task is performed by different worker processes, and performed at a rate that does not exceed a predetermined interval. In one example, a plurality of worker processes attempt, over a period of time, to acquire a task lock. One worker process of the plurality of worker processes is successful at acquiring the task lock. The one worker process performs a task that is associated with the task lock. For example, the one worker process may synchronize a copy of a calendar that is used by all the worker processes. The one worker process sets a timer for an amount of time, such as, for example, thirty seconds, that prevents any other worker process from acquiring the task lock for thirty seconds, thus ensuring that the calendar is not synchronized more often than every 30 seconds. This process continually repeats such that any worker process may eventually acquire the task lock and then synchronize the copy of the calendar, thereby ensuring that the task of synchronizing the copy of the calendar is balanced among all the worker processes.

FIG. 1 is a block diagram of an environment 10 in which examples may be practiced. The environment 10 includes a computing device 12 that implements a data processing service via a plurality of worker processes 14-1-14-N (generally, worker processes 14). The worker processes 14 can be any process that both handles service requests and has a responsibility for performing a task associated with a task lock. In this example, the worker processes 14 intermittently receive service requests from one or more mobile devices 16-1-16-N (generally, mobile devices 16). The data processing service involves a centralized resource 18, which in this example is a synchronized calendar 20 that maintains information regarding service appointments for a plurality of different service engineers 22-1-22-N (generally, service engineers 22). It is noted that because the worker processes 14 are components of the computing device 12, functionality implemented by the worker processes 14 may be attributed to the computing device 12 generally. Moreover, in examples where the worker processes 14 comprise software instructions that program a processor device to carry out functionality discussed herein, functionality implemented by the worker processes 14 may be attributed herein to such processor device. While for purposes of illustration the worker processes 14 are shown as being associated with a single computing device 12, in other examples, the worker processes 14 may be distributed across any number of computing devices 12, or execute in conjunction with different virtual machines.

The service engineers 22 are directed by an entity 24, such as a company, to resolve issues encountered by employees or customers of the entity 24. The entity 24 maintains a remote computing device 26 on which an appointment calendar 28 of all service appointments is maintained. The appointment calendar 28 may be updated on an ad-hoc basis as the entity 24 learns of problems encountered by its employees or customers.

The mobile device 16-1 periodically issues a service request to the data processing service 13. In particular, the mobile device 16-1 requests calendar data that identifies service appointments associated with the service engineer 22-1. The service request may include identifying information, such as a service engineer identifier that identifies the service engineer 22-1. A worker process 14, such as the worker process 14-1, receives the service request, accesses the synchronized calendar 20, and obtains data that identifies the service appointments associated with the service engineer 22-1. The worker process 14 sends the data to the mobile device 16-1, which may then stores the information in a local appointment calendar 30. This process may be repeated periodically, intermittently, or on demand, by tens, hundreds, or thousands of mobile devices 16.

The synchronized calendar 20 is a local copy of the appointment calendar 28. The appointment calendar 28 may be referred to as a "remote" appointment calendar 28 because it is maintained separately from the synchronized calendar 20. So that the mobile devices 16 obtain relatively up-to-date service appointment data, the synchronized calendar 20 is periodically or intermittently synchronized with the appointment calendar 28. In particular, in one example, each worker process 14, at a predetermined, arbitrary, random, or other time interval, invokes a task lock function 32 in an attempt to acquire a task lock 34. The task lock function 32 determines if the task lock 34 is currently locked. If so, the task lock function 32 informs the worker process 14 that the worker process 14 did not successfully acquire the task lock 34. The worker process 14 may then wait a predetermined, arbitrary, random or other amount of time, and try again. If the task lock 34 is not currently locked, the task lock function 32 locks the task lock 34 and informs the worker process 14 that the worker process 14 has successfully acquired the task lock 34.

The worker process 14 then performs a task associated with the task lock 34. In this example, the worker process 14 synchronizes the synchronized calendar 20 with the appointment calendar 28. This may involve, for example, requesting information from the remote computing device 26, formatting data received from the remote computing device 26, and the like.

After completing the synchronization of the synchronized calendar 20, the worker process 14 sets a timer 36 for an amount of time that prevents acquisition of the task lock 34 by any other worker process 14 for the amount of time. The amount of time may be predetermined or may be arbitrary, or may be an arbitrary amount of time greater than a predetermined minimum amount of time, or may be any other amount of time. Thus the synchronized calendar 20 will be synchronized no more often than the amount of time to which the timer 36 is set.

The worker process 14 may then return to processing service requests from the mobile devices 16. Each other worker process 14 periodically, or randomly invokes the task lock function 32 in an attempt to acquire the task lock 34. So long as the timer 36 has not expired, the task lock function 32 informs the worker process 14 that the task lock 34 is already locked, and thus the worker process 14 was not able to acquire the task lock 34.

Figure 2:
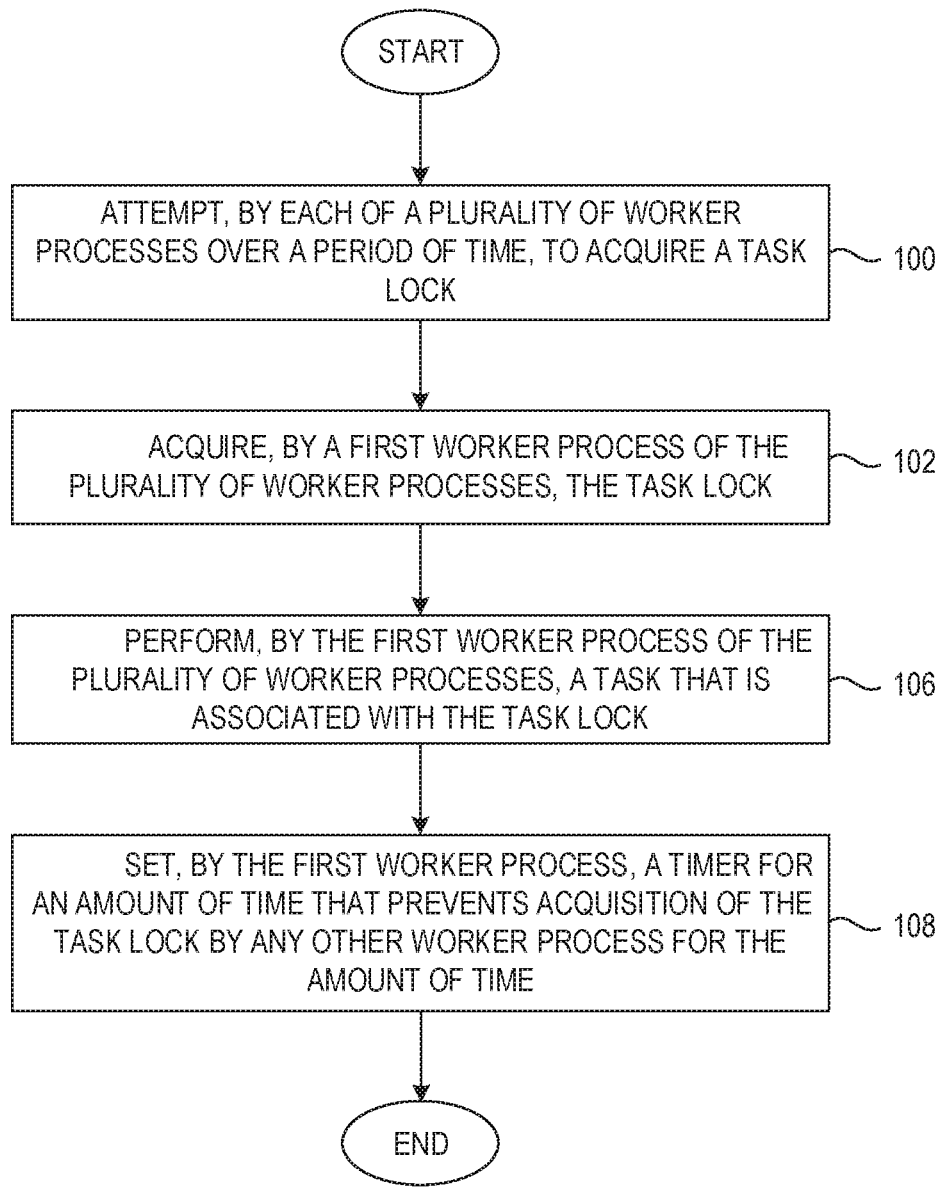
FIG. 2 is a flowchart of a method for balancing a recurring task between multiple worker processes according to one example.

FIG. 2 is a flowchart of a method for balancing a recurring task between multiple worker processes 14 according to one example. FIG. 2 will be discussed in conjunction with FIG. 1. Each of the plurality of worker processes 14 attempts, over a period of time, to acquire the task lock 34 (FIG. 2, block 100). A first worker process 14, such as the worker process 14-1, acquires the task lock 34 (FIG. 2, block 102). The worker process 14-1 performs a task, such as, in this example, the synchronization of the synchronized calendar 20, that is associated with the task lock 34 (FIG. 2, block 104). The worker process 14-1 sets the timer 36 for an amount of time that prevents acquisition of the task lock 34 by any other worker process 14 for the amount of time (FIG. 2, block 106).

Figure 3:
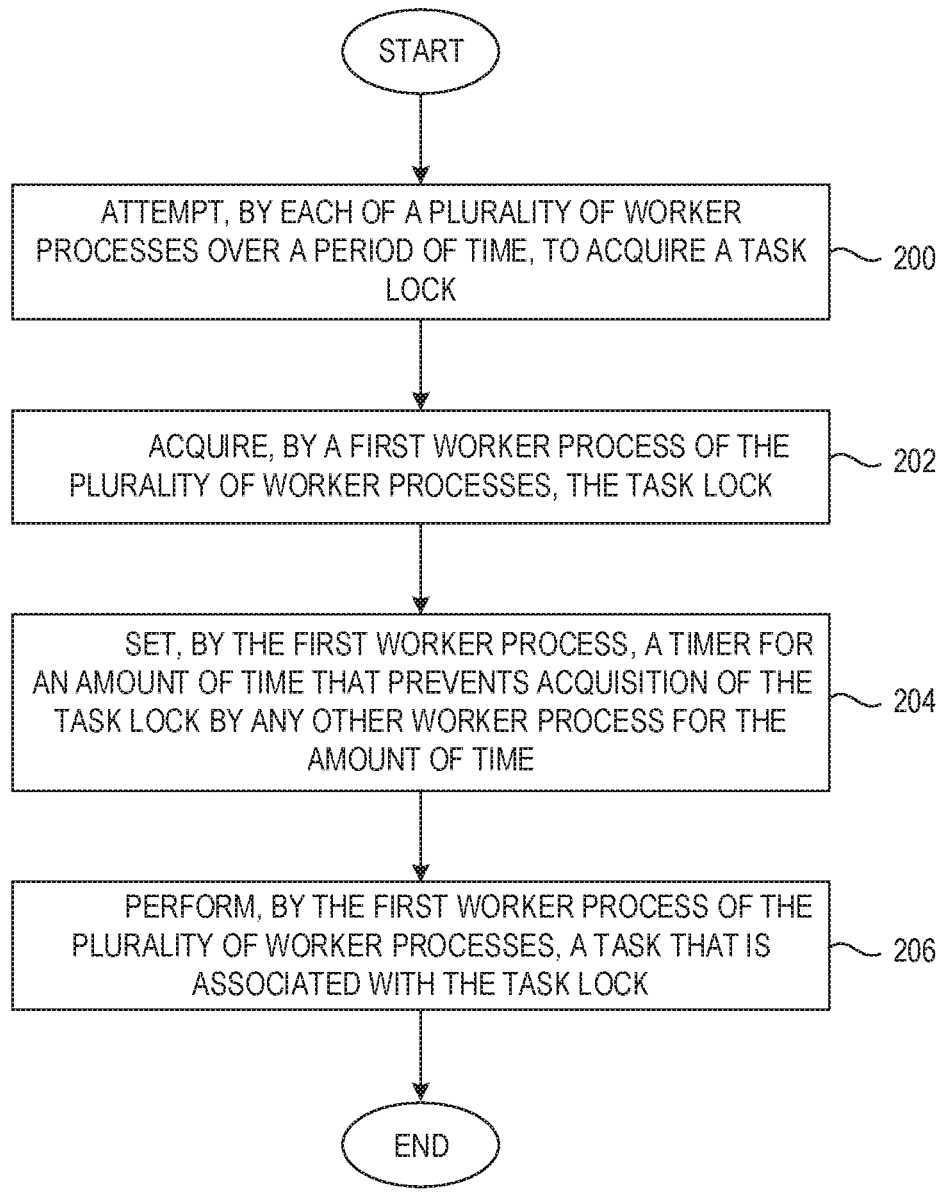
FIG. 3 is a flowchart of a method for balancing a recurring task between multiple worker processes according to another example.

FIG. 3 is a flowchart of a method for balancing a recurring task between multiple worker processes 14 according to another example. FIG. 3 will be discussed in conjunction with FIG. 1. Each of the plurality of worker processes 14 attempts, over a period of time, to acquire the task lock 34 (FIG. 3, block 200). A first worker process 14, such as the worker process 14-1, acquires the task lock 34 (FIG. 3, block 202). The worker process 14-1 sets the timer 36 for an amount of time that prevents acquisition of the task lock 34 by any other worker process 14 for the amount of time (FIG. 3, block 204).

The worker process 14-1 performs a task, such as, in this example, the synchronization of the synchronized calendar 20, that is associated with the task lock 34 (FIG. 3, block 206).

Figure 4:
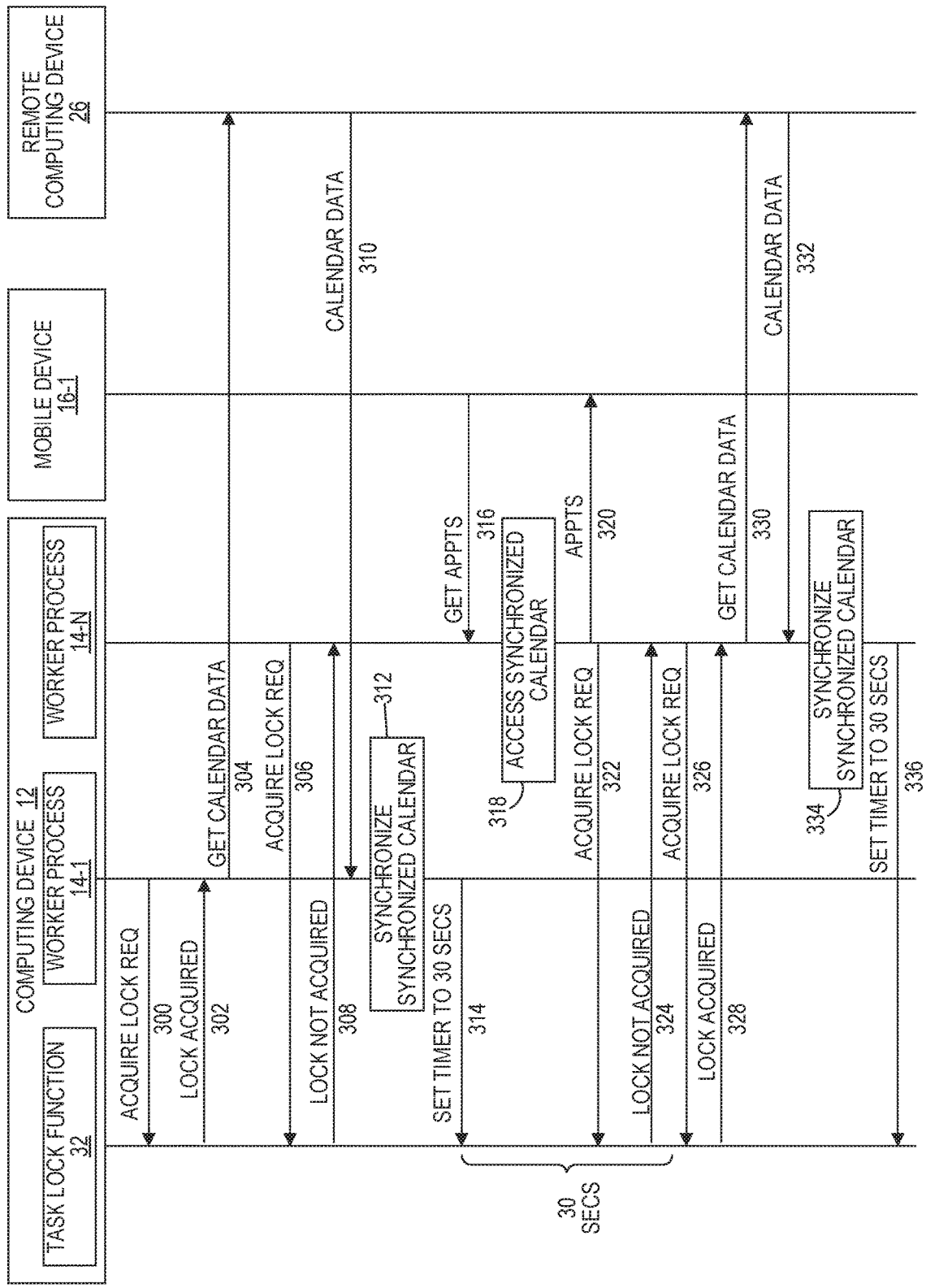
FIG. 4 is a message flow diagram that illustrates message transmissions and processing in the environment illustrated in FIG. 1 according to one example.

FIG. 4 is a message flow diagram that illustrates message transmissions and processing in the environment 10 according to one example. While for purposes of illustration steps are described in a certain sequence, the examples are not limited to the exact sequence of steps discussed herein with regard to FIG. 4. The worker process 14-1 invokes the task lock function 32 to attempt to acquire the task lock 34 (step 300). The task lock function 32 determines that the task lock 34 is unlocked, and thus locks the task lock 34, and notifies the worker process 14-1 that the worker process 14-1 has successfully acquired the task lock 34 (step 302). In response to acquiring the task lock 34, the worker process 14-1 begins to perform the task associated with the task lock 34. In particular, the worker process 14-1 sends a request for calendar data to the remote computing device 26 (step 304). The worker process 14-N invokes the task lock function 32 in an attempt to acquire the task lock 34 (step 306). Because the task lock 34 was already locked by the task lock function 32, the task lock function 32 informs the worker process 14-N that the task lock 34 was not acquired (step 308).

The remote computing device 26 sends the requested calendar data to the worker process 14-1 (step 310). The worker process 14-1 synchronizes the synchronized calendar 20 based on the calendar data (step 312). After the worker process 14-1 synchronizes the synchronized calendar 20, the worker process 14-1 invokes the task lock function 32 to set the timer 36 to an amount of time, in this example 30 seconds (step 314). Note that in other examples, the worker process 14-1 may set the time to the desired amount of time prior to performing the task associated with the task lock 34. Thus, the worker process 14-1 may, after acquiring the task lock 34, immediately set the timer 36 to the amount of time, and may then begin the process of synchronizing the synchronized calendar 20.

The mobile device 16-1 issues a service request for appointments for the service engineer 22-1 (step 316). The worker process 14-N receives the request, accesses the synchronized calendar 20, and sends a list of appointments to the mobile device 16-1 (steps 318-320). The worker process 14-N may again invoke the task lock function 32 to attempt to acquire the task lock 34 (step 322). Because the timer 36 has not yet expired, the task lock 34 is still locked, and the task lock function 32 informs the worker process 14-N that the task lock was not acquired (step 324). After a predetermined or arbitrary amount of time, the worker process 14-N again invokes the task lock function 32 to attempt to acquire the task lock 34 (step 326). Because the timer 36 has expired, the task lock function 32 determines that the task lock 34 is unlocked, and thus locks the task lock 34, and notifies the worker process 14-N that the worker process 14-N has successfully acquired the task lock 34 (step 328). In response to acquiring the task lock 34, the worker process 14-N begins to perform the task associated with the task lock 34. In particular, the worker process 14-N sends a request for calendar data to the remote computing device 26 (step 330). The remote computing device 26 sends the requested calendar data to the worker process 14-N (step 332). The worker process 14-N synchronizes the synchronized calendar 20 based on the calendar data (step 334). After the worker process 14-N synchronizes the synchronized calendar 20, the worker process 14-N invokes the task lock function 32 to set the timer 36 to 30 seconds (step 336). In this manner, the process of synchronizing the synchronized calendar 20 is spread among the plurality of worker processes 14, and the process of synchronizing the synchronized calendar 20 is not performed any more frequently than the amount of time to which the timer 36 is set by the worker process 14 that acquires the task lock 34.

Figure 5:
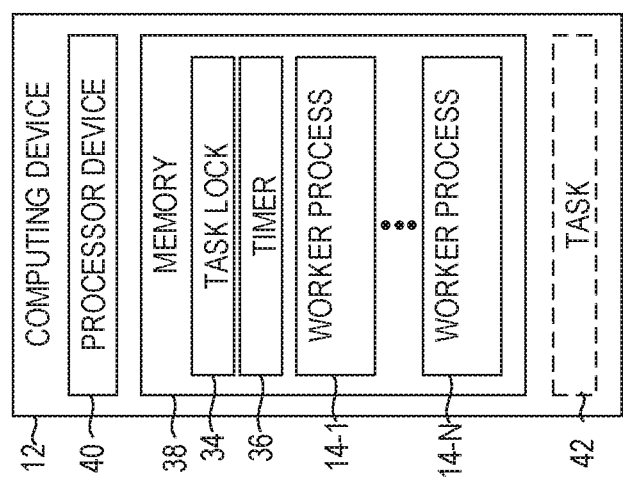
FIG. 5 is a block diagram of the environment illustrated in FIG. 1 according to another example.

FIG. 5 is a block diagram of the environment 10 according to another example. In this example the computing device 12 includes a memory 38 and a processor device 40 coupled to the memory 38. The processor device 40 is to initiate the plurality of worker processes 14. Each of the plurality of worker processes 14 over a period of time attempts to acquire the task lock 34. A first worker process 14, such as the worker process 14-1, acquires the task lock 34. The worker process 14-1 performs a task 42 that is associated with the task lock 34.

Figure 6:
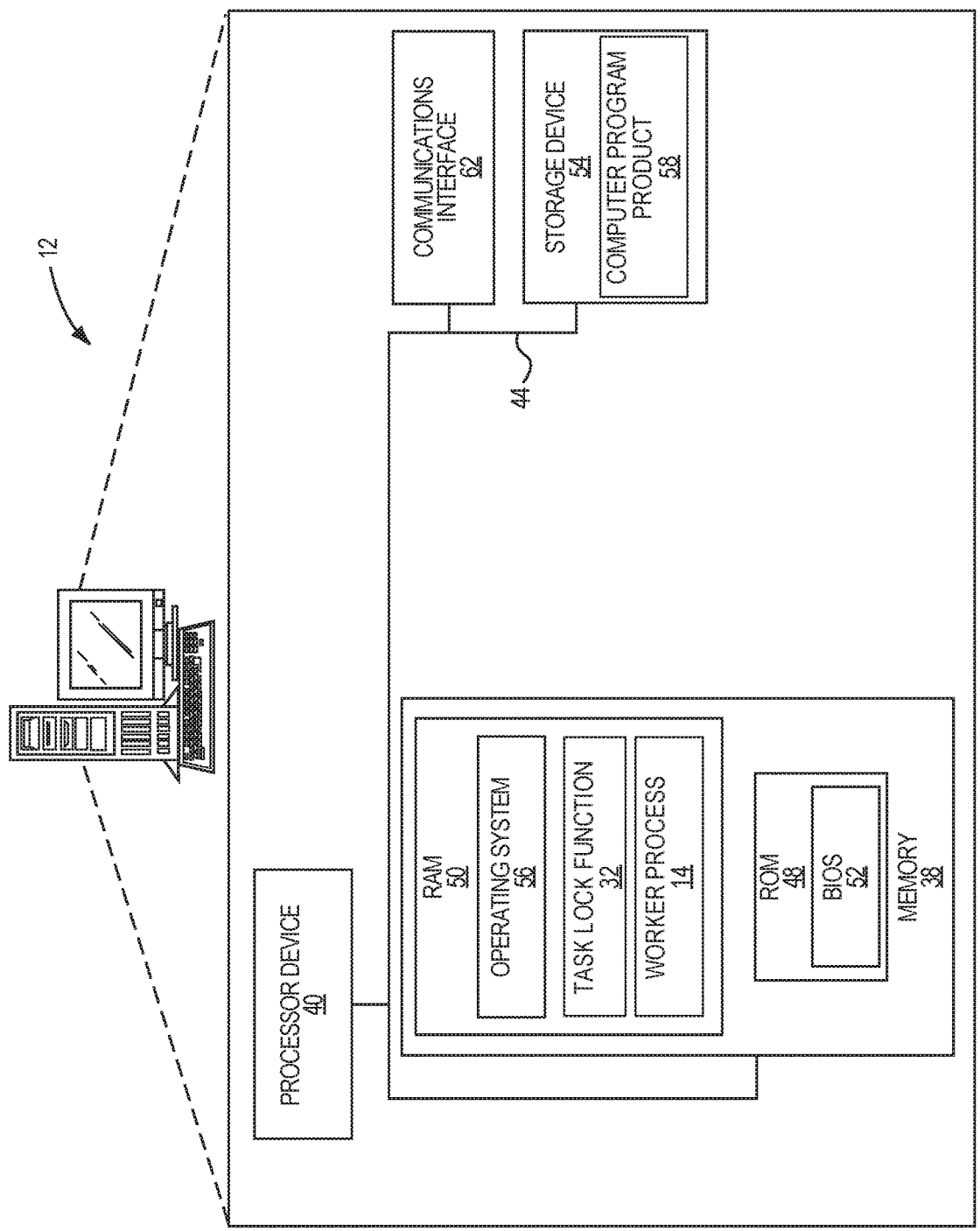
FIG. 6 is a block diagram of a computing device suitable for implementing examples according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 40, the system memory 38, and a system bus 44. The system bus 44 provides an interface for system components including, but not limited to, the system memory 38 and the processor device 40. The processor device 40 can be any commercially available or proprietary processor.

The system bus 44 may be any of several types of bus structures that may further interconnect to a memory bus (with or without a memory controller), a peripheral bus, and/or a local bus using any of a variety of commercially available bus architectures. The system memory 38 may include non-volatile memory 48 (e.g., read-only memory (ROM), erasable programmable read-only memory (EPROM), electrically erasable programmable read-only memory (EEPROM), etc.), and volatile memory 50 (e.g., random-access memory (RAM)). A basic input/output system (BIOS) 52 may be stored in the non-volatile memory 48 and can include the basic routines that help to transfer information between elements within the computing device 12. The volatile memory 50 may also include a high-speed RAM, such as static RAM, for caching data.

The computing device 12 may further include or be coupled to a non-transitory computer-readable storage medium such as a storage device 54, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 54 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 54 and in the volatile memory 50, including an operating system 56 and one or more program modules, such as the task lock function 32 and the worker processes 14, which may implement the functionality described herein in whole or in part.

All or a portion of the examples may be implemented as a computer program product 58 stored on a transitory or non-transitory computer-usable or computer-readable storage medium, such as the storage device 54, which includes complex programming instructions, such as complex computer-readable program code, to cause the processor device 40 to carry out the steps described herein. Thus, the computer-readable program code can comprise software instructions for implementing the functionality of the examples described herein when executed on the processor device 40. The processor device 40, in conjunction with the task lock function 32 and the worker processes 14, may serve as a controller, or control system, for the computing device 12 that is to implement the functionality described herein.

The computing device 12 may also include a communications interface 62 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method for balancing a recurring task among a plurality of worker processes by a computing device that implements a data processing service, wherein the computing device maintains a synchronized appointment calendar and is connected to a plurality of mobile devices and a remote entity that maintains a remote appointment calendar, comprising:

receiving, by the data processing service, a first plurality of service requests from the plurality of mobile devices;

providing, by a first worker process of the plurality of worker processes, a first data processing service comprising providing appointments stored in a local copy of data in the synchronized appointment calendar to the plurality of mobile devices in response to the first plurality of service requests, wherein the plurality of worker processes are configured to execute a recurring task upon acquisition of a task lock, the recurring task being a data synchronization task that is different from the first data processing service, and wherein each of the plurality of worker processes are configured to provide the first data processing service in response to service requests received by a respective worker process;

acquiring, after a predetermined, arbitrary, random, or other time interval, by the first worker process of the plurality of worker processes, the task lock;

performing, by the first worker process of the plurality of worker processes, the data synchronization task that is associated with the task lock by synchronizing the local copy of data in the synchronized appointment calendar with at least one remote copy of data in the remote appointment calendar;

setting, by the first worker process prior to performing the data synchronization task that is associated with the task lock, a timer for an amount of time that prevents acquisition of the task lock by any other worker process of the plurality of worker processes for the amount of time;

unsuccessfully attempting, by a second worker process prior to expiration of the timer, to acquire the task lock;

providing, by the first worker process, the first data processing service in response to a second plurality of service requests during a period of time between setting the timer and expiration of the timer;

subsequent to expiration of the timer, acquiring, by the second worker process, the task lock; and performing, by the second worker process, the data synchronization task by synchronizing the local copy of data with the at least one remote copy of data.

2. The method of claim 1 wherein performing, by the first worker process, the data synchronization task that is associated with the task lock further comprises:

synchronizing the local copy of data with the at least one remote copy of data; and further comprising:

receiving, by the first worker process, a service request;

in response to the service request, accessing the local copy of data; and providing a response to the service request based on the local copy of data.

3. The method of claim 1 further comprising after performing the data synchronization task that is associated with the task lock, repeatedly attempting, by the first worker process, to acquire the task lock at predetermined intervals.

4. The method of claim 1 further comprising repeatedly attempting, by each worker process of the plurality of worker processes, to acquire the task lock at predetermined intervals.

5. The method of claim 1 further comprising repeatedly attempting, by each worker process of the plurality of worker processes, to acquire the task lock at random intervals.

6. A computing device for balancing a recurring task among a plurality of worker processes, wherein the computing device implements a data processing service and maintains a synchronized appointment calendar and is connected to a plurality of mobile devices and a remote entity that maintains a remote appointment calendar, comprising:

a memory; and a processor device coupled to the memory to:

initiate the plurality of worker processes;

receive a first plurality of service requests from the plurality of mobile devices;

provide, by a first worker process of the plurality of worker processes, a first data processing service comprising providing appointments stored in a local copy of data in the synchronized appointment calendar to the plurality of mobile devices in response to the first plurality of service requests, wherein the plurality of worker processes are configured to execute a recurring task upon acquisition of a task lock, the recurring task being a data synchronization task that is different from the first data processing service, and wherein each of the plurality of worker processes are configured to provide the first data processing service in response to service requests received by a respective worker process;

acquire, after a predetermined, arbitrary, random, or other time interval, by the first worker process of the plurality of worker processes, the task lock;

perform, by the first worker process of the plurality of worker processes, the data synchronization task that is associated with the task lock by synchronizing the local copy of data in the synchronized appointment calendar with at least one remote copy of data in the remote appointment calendar;

set, by the first worker process prior to performing the data synchronization task that is associated with the task lock, a timer for an amount of time that prevents acquisition of the task lock by any other worker process of the plurality of worker processes for the amount of time;

unsuccessfully attempt, by a second worker process prior to expiration of the timer, to acquire the task lock;

provide, by the first worker process, the first data processing service in response to a second plurality of service requests during a period of time between setting the timer and expiration of the timer;

subsequent to expiration of the timer, acquire, by the second worker process, the task lock; and perform, by the second worker process, the data synchronization task by synchronizing the local copy of data with the at least one remote copy of data.

7. The computing device of claim 6 wherein to perform, by the first worker process, the data synchronization task that is associated with the task lock, the processor device is further to:

synchronize, via the first worker process, the local copy of data with the at least one remote copy of data; and wherein the processor device is further to:
receive, by the first worker process, a service request;
in response to the service request, access the local copy of data; and
provide a response to the service request based on the local copy of data.

8. A computer program product for balancing a recurring task among a plurality of worker processes by a computing device that implements a data processing service, wherein the computing device maintains a synchronized appointment calendar and is connected to a plurality of mobile devices and a remote entity that maintains a remote appointment calendar, and wherein the computer program product is stored on a non-transitory computer-readable storage medium and includes instructions to cause a processor device to:

initiate the plurality of worker processes;

receive, by the data processing service, a first plurality of service requests from the plurality of mobile devices;

provide, by a first worker process of the plurality of worker processes, a first data processing service comprising providing appointments stored in a local copy of data in the synchronized appointment calendar to the plurality of mobile devices in response to the first plurality of service requests, wherein the plurality of worker processes are configured to execute a recurring task upon acquisition of a task lock, the recurring task being a data synchronization task that is different from the first data processing service, and wherein each of the plurality of worker processes are configured to provide the first data processing service in response to service requests received by a respective worker process;

acquire, after a predetermined, arbitrary, random, or other time interval, by the first worker process of the plurality of worker processes, the task lock;

perform, by the first worker process of the plurality of worker processes, the data synchronization task that is associated with the task lock by synchronizing the local copy of data in the synchronized appointment calendar with at least one remote copy of data in the remote appointment calendar;

set, by the first worker process prior to performing the data synchronization task that is associated with the task lock, a timer for an amount of time that prevents acquisition of the task lock by any other worker process of the plurality of worker processes for the amount of time;

unsuccessfully attempt, by a second worker process prior to expiration of the timer, to acquire the task lock;

provide, by the first worker process, the first data processing service in response to a second plurality of service requests during a period of time between setting the timer and expiration of the timer;

subsequent to expiration of the timer, acquire, by the second worker process, the task lock; and perform, by the second worker process, the data synchronization task by synchronizing the local copy of data with the at least one remote copy of data.

9. The computer program product of claim 8 wherein to perform, by the first worker process, the data synchronization task that is associated with the task lock, the instructions further cause the processor device to:

synchronize, via the first worker process, the local copy of data with the at least one remote copy of data; and wherein the instructions further cause the processor device to:
receive, by the first worker process, a service request;
in response to the service request, access the local copy of data; and
provide a response to the service request based on the local copy of data.

10. The method of claim 1, further comprising:
at a point in time after providing the first data processing service in response to the second plurality of service requests, acquiring, by the first worker process of the plurality of worker processes, the task lock;
performing, by the first worker process of the plurality of worker processes, the recurring task that is associated with the task lock;
setting, by the first worker process, the timer for the amount of time that prevents acquisition of the task lock by any other worker process of the plurality of worker processes for the amount of time; and
providing, by the first worker process, the first data processing service in response to a third plurality of service requests during the period of time between setting the timer and expiration of the timer.

* * * * *